United States Patent [19]

Bulanchuk

[11] 4,018,497

[45] Apr. 19, 1977

[54] JOINT FOR ELECTRICAL CONDUCTORS

[75] Inventor: William J. Bulanchuk, Pelham, N.Y.

[73] Assignee: Midland-Ross Corporation, Cleveland, Ohio

[22] Filed: Nov. 24, 1975

[21] Appl. No.: 634,418

[52] U.S. Cl. .................... 339/22 B; 174/94 S; 191/44.1; 339/255 R; 403/393

[51] Int. Cl.² ...................... H01R 11/22

[58] Field of Search ............. 339/22 R, 22 B, 47, 339/244 R, 255 R, 255 L, 256 R, 256 S, 273 S; 174/94 S, 99 E; 191/44.1; 403/341, 393

[56] References Cited

UNITED STATES PATENTS

| | | | |
|---|---|---|---|
| 717,684 | 1/1903 | Humphreys | 403/341 |
| 1,977,343 | 10/1934 | Matthes | 191/44.1 |
| 2,933,567 | 4/1960 | Mageoch | 191/44.1 |
| 2,994,734 | 8/1961 | Scofield | 191/44.1 |
| 3,140,141 | 7/1964 | Nava | 339/256 R |
| 3,341,670 | 9/1967 | Martin | 191/44.1 |

*Primary Examiner*—Roy Lake
*Assistant Examiner*—Mark S. Bicks
*Attorney, Agent, or Firm*—H. Duane Switzer

[57] ABSTRACT

A joint for electrical conductors includes a connecting member having a longitudinal groove therein for receiving joining portions on a pair of electrical conductors. Biasing means carried by the conductors act against the groove bottom for biasing joining surfaces on the conductors into firm engagement with joining groove surfaces. The joint accommodates longitudinal thermal expansion and contraction of busbars or the like.

13 Claims, 8 Drawing Figures

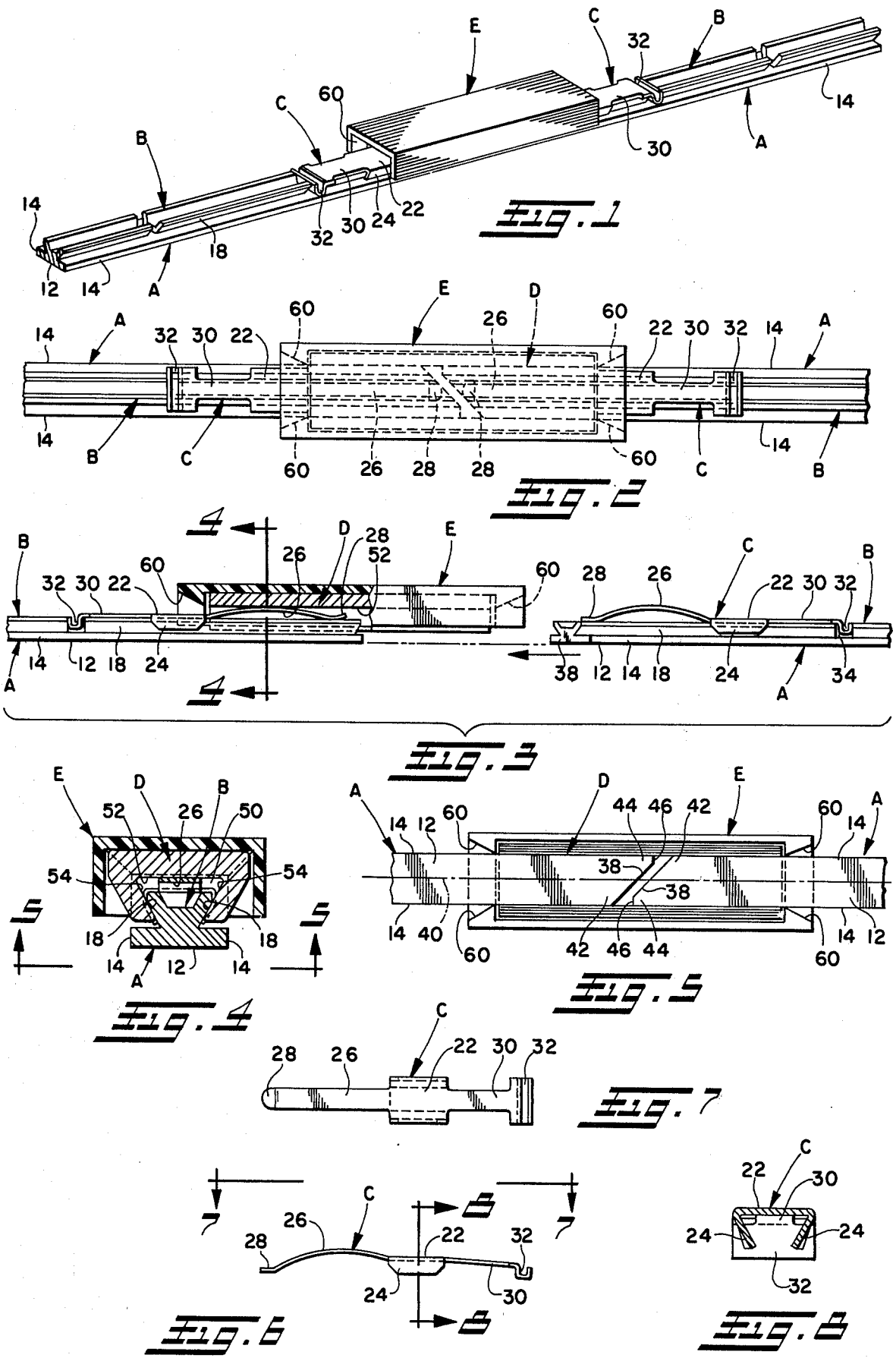

JOINT FOR ELECTRICAL CONDUCTORS

BACKGROUND OF THE INVENTION

This application relates to the art of electrical connections and, more particularly, to joints between elongated rigid conductors. The invention is particularly applicable to joints between electrical busbars used in trolley busway systems and will be particularly described with reference thereto. However, it will be recognized that the improved electrical joint of the present application can be used with conductors other than busbars in trolley busway systems.

Trolley busway systems commonly include a housing surrounding and carrying a plurality of busbars. A trolley rides along a track in the housing and has brushes engaging the busbars. Housing sections must be joined together for assembling a complete trolley busway system and the busbars in each housing section must also be connected together. Busbar connectors requiring the use of screws and the like make joining thereof very time consuming. The joints must also be relatively smooth so the brushes on the trolley will not come out of engagement with the busbars when the brushes cross a joint. With rigid joints, longitudinal thermal expansion and contraction of the busbars may cause same to buckle or otherwise fail.

It would be desirable to have a busbar joint which could be made without requiring the use of screws or the like, while providing a very secure joint which accommodates longitudinal thermal expansion and contraction of busbars and maintains excellent current carrying ability, and provides a smooth transition from one busbar to another.

SUMMARY OF THE INVENTION

A joint for elongated rigid electrical conductors of the type including a main body portion having a generally flat outer surface and a joining portion extending from the main body portion opposite from the flat outer surface for reception in a connecting member to form the joint. The joining portion has joining surfaces facing generally toward the main body portion in outwardly-spaced relationship thereto.

A connecting member has a longitudinal groove therein including a longitudinal groove opening and opposite end groove openings. The groove has a bottom spaced from the longitudinal groove opening and includes groove joining surfaces facing generally toward the groove bottom in outwardly-spaced relationship thereto.

A pair of conductors have the joining portions on their end portions received through the open groove ends, with the main body portions of the end portions located outside of the groove adjacent the longitudinal groove opening. Yieldable biasing means carried by each conductor end portion biases against the groove bottom for urging the joining surfaces on the joining portions and groove into firm engagement with one another.

In one arrangement, the yieldable biasing means comprises joining means having an attaching portion receiving the joining portion on each conductor for attaching the joining means thereto. A bowed spring portion extends upwardly and then downwardly from the attaching portion in a direction from the attaching portion toward the terminal end of each conductor. An integral tang on the attaching portion extends therefrom in a direction opposite to the bowed spring, and the tang has a downwardly bent portion received in a transverse slot in the joining portion for preventing longitudinal movement of the joining means relative to the conductor. line to The bowed spring is preferably stressed so that its outer end engages the joining portion before the joining portions are positioned in the groove. The bowed spring is further stressed by deformation thereof toward the joining portion by engagement with the groove bottom. The outer end of the bowed spring is preferably flattened for facilitating sliding movement thereof relative to the joining portion when the bowed spring is deformed toward the joining portion.

In accordance with another aspect of the invention, the terminal end of each conductor extends diagonally of the conductor longitudinal axis and the flat outer surface or main body portion of the conductor has opposite side edges. The diagonal terminal end intersects one side edge at an included obtuse angle to define an obtuse corner, while intersecting the other side edge at an included acute angle to define an acute corner. The acute corner is cut off along a line extending generally perpendicular to the conductor longitudinal axis, and the lines has a length which is less than the distance from the other side edge of the conductor longitudinal axis. The conductors are positioned in the connecting member with the obtuse corner on one terminal end facing the acute corner on the other terminal end.

The busbars are positioned with their terminal ends spaced-apart slightly when the joint is first assembled so the connecting member and terminal ends can move longitudinally relative to one another for accommodating longitudinal thermal expansion and contraction of the busbars.

It is a principal object of the present invention to provide an improved joint between electrical conductors.

It is also an object of the present invention to provide an improved joint having a smooth transition so that brushes of a trolley sliding along the conductor will not be separated from the conductors when they pass over the joint.

It is an additional object of the invention to provide an improved electrical joint which is easily made without requiring the use of screws or the like.

It is another object of the invention to provide an electrical joint which accommodates thermal expansion and contraction of conductors while maintaining full current carrying capability.

It is a further object of the invention to provide an improved electrical joint which is very secure and provides good conductivity from one conductor to another past the joint.

BRIEF DESCRIPTION OF THE DRAWING

FIG. 1 is a perspective illustration of the improved joint of the present application;

FIG. 2 is a top elevational view of a joint between a pair of electrical conductors;

FIG. 3 is a side elevational view of a joint between a pair of electrical conductors, and with portions cut away for clarity of illustration, and with one conductor being shown positioned for movement into a connecting member;

FIG. 4 is a cross-sectional elevational view taken generally on line 4—4 of FIG. 3;

FIG. 5 is a bottom elevational view looking generally in the direction of arrows 5—5 of FIG. 4;

FIG. 6 is a side elevational view of a joining means which includes yieldable biasing means;

FIG. 7 is a top plan view looking generally in the direction of arrows 7—7 of FIG. 6; and FIG. 8 is a cross-sectional elevational view taken generally on line 8—8 of FIG. 6.

DESCRIPTION OF A PREFERRED EMBODIMENT

Referring now to the drawing, wherein the showings are for purposes of illustrating a preferred embodiment of the invention only and not for purposes of limiting same, FIG. 1 shows a pair of elongated rigid electrical conductors each having a main body portion A and a connecting portion B. Main body portion A has a substantially flat outer surface 12 and opposite longitudinal side edges 14. Integral joining portion B is centrally located on main body portion A and extends outwardly therefrom opposite from flat outer surface 12.

In the arrangement shown, joining portion B is generally V-shaped in cross section. Joining portion B is integrally connected with body portion A by a relatively narrow portion and then diverges outwardly. Joining portion B has opposite outer joining surfaces 18 which face generally toward main body portion A in spaced relationship thereto.

Joining means C which includes yieldable biasing means is attached to the joining portion on the terminal end portion of each conductor. Joining means C includes an attaching portion generally indicated at 22 having a top flat portion with downwardly and inwardly extending legs 24 as shown in FIG. 8. The top flat portion of attaching portion 22 cooperates with legs 24 to define a groove having generally the same cross-sectional size and shape as joining portion B. A bowed spring 26 is smoothly bent upwardly and then downwardly from attaching portion 22 in a direction from attaching portion 22 toward the terminal end of a conductor. The free end of bowed spring 26 is flattened as at 28 and engages joining portion B. When joining means C is secured to a conductor, bowed spring 26 is stressed somewhat so that flat terminal end portion 28 is firmly engaging joining portion B. Flattened end portion 28 facilitates sliding movement of the end portion of bowed spring 26 on joining portion B when bowed spring 26 is stressed by deforming it toward joining portion B.

A tang 30 extends rearwardly from attaching portion 22 in a direction opposite from bowed spring 26 and has a widened downwardly bent reversely curved portion 32 received in a transverse slot 34 in joining portion B for locking joining means C against longitudinal movement relative to the conductor.

Terminal end 38 of each conductor extends diagonally of conductor longitudinal axes 40. Each terminal end 38 may extend at an angle of approximately 45° with respect to longitudinal axes 40. Each terminal end 38 intersects one side edge 14 at an included obtuse angle to define an obtuse corner 42 and intersects the other side edge 14 at an included acute angle to define an acute corner 44. The acute corners are cut off along a line 46 extending generally perpendicular to axes 40, and have a length substantially less than the distance from one side edge 14 to longitudinal axes 40.

An elongated metal connecting member D has a longitudinal groove 50 therein which is narrower where it opens outwardly longitudinally of connecting member D than interiorly thereof. Groove 50 includes a groove bottom 52 spaced inwardly of connecting member D from the longitudinal groove opening therein, and opposite groove sidewalls 54 which define groove joining surfaces facing generally toward groove bottom 52. Groove 50 has opposite groove end openings at the opposite ends of connecting member D. The cross-sectional shape of groove 50 is generally similar to the cross-sectional shape of joining portion B, and of somewhat larger cross-sectional size. Groove joining surfaces 54 slope at generally the same angle as joining surfaces 18 of joining portion B and the longitudinal groove opening is narrower than a major portion of the height of joining portion B. A cover member E of synthetic plastic material having a dielectric constant substantially greater than unity covers the bottom and sides of connecting member D for insulating adjacent joints from one another. Without cover member E, the air gap between adjacent connecting members D would be too small in some instances to provide sufficient electrical insulation. The opposite ends of cover member E have inwardly sloping walls 60 which slope toward the opposite groove end openings at the opposite ends of connecting member D for aiding insertion of joining portions on the connectors into the ends of groove 50.

As best shown in FIG. 3, an end portion of a conductor is moved toward connecting member D with the terminal end of joining portion B aligned with an open groove end of groove 50. Axial force is applied for moving the conductor and connecting member longitudinally toward one another so that joining portion B slides into groove 50 with joining surfaces 18 of joining portion B engaging groove joining surfaces 54. In the normal position of bowed spring 26, it projects outwardly from joining portion B a distance substantially greater than the distance from joining portion B to groove bottom 52. Therefore, when an end portion of a conductor is longitudinally telescoped within groove 50, bowed spring 26 is further stressed by being bent toward joining portion B. This renders bowed spring 26 a yieldable biasing means for biasing joining portion B away from groove bottom 52 for firmly engaging joining surfaces 18 and 54. The frictional engagement between spring 26 and groove bottom 52, and between joining surfaces 18 and 54, makes a very secure joint which is not easily separated and provides good conductive paths from one conductor to the other across the joint.

The obtuse corner 42 on one conductor faces toward the acute corner 44 on the other conductor as shown in FIG. 5. The diagonal joint formed between diagonal terminal ends 38 insures a smooth joint so that brushes on a trolley will cross the joint from one conductor to another without bouncing out of engagement with the conductors. Conductors of the type described are sometimes twisted slightly when they are positioned within the connecting member. In the event there is some relative twist between the conductors, the sharp peaks at acute corners 44 would normally cause a rather large drop across the joint so the brushes on the trolley might come out of engagement with the conductors. Cutting off the peaks of the acute corners as shown in FIG. 5 substantially eliminates any step even if the conductors are slightly twisted relative to one another.

The terminal end portions of conductors A are assembled within connecting member D with terminal ends 38 thereof longitudinally spaced-apart from one another a relatively small distance. This spacing will depend upon the size of the conductors and the temperature variations expected. In one arrangement, this spacing has been approximately 3/32 inch. Although the joint is very secure and strongly held together by frictional engagement between the parts, longitudinal relative sliding movement between the connecting member and conductors can take place for accommodating thermal expansion and contraction when terminal ends 38 are longitudinally spaced from one another a small distance and legs 24 on joining means C are spaced outwardly slightly from the ends of metal connecting member D. The temperature of the conductors varies with ambient temperature and with variations in current flow. The gap or space between conductor terminal ends, and the frictional assembly of the joint, freely allows expansion and contraction while maintaining full current carrying capability across the joint. The normal temperature operating range is such that the gap between the conductor terminal ends will not become sufficiently large to prevent a smooth transition of the trolley contacts past the joint. The gap between the conductor terminal ends is sufficiently small that the end portions defined by lines 46 of the cut-off peaks always overlap one another a substantial distance on opposite sides of axis 40.

Joining means C is applied to a connecting portion B by resiliently bending tang 30 upwardly and inserting a joining portion B longitudinally between legs 24 of FIG. 8. Joining means C is then slid longitudinally along joining portion B until downwardly bent reversely curved portion 32 on tang 30 snaps into transverse groove 34. The distance along the center longitudinal axis of a conductor from a terminal end 38 to the edges of attaching portion 22 is not less than the distance from one terminal end of connecting member D to the midpoint thereof along groove 50. This insures that terminal ends 38 of two conductors will firmly abut one another as shown in FIG. 5 before the forward edges of attaching portions 22 abut the terminal ends of connecting member D adjacent the groove end openings therein.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A joint comprising a pair of elongated electrical conductors having end portions which are connected, said end portions having longitudinal axes, main body portions and joining portions, said joining portions having joining portion surfaces facing generally toward said main body portions in spaced relationship thereto, a connecting member having a longitudinal groove therein, said groove having a longitudinal groove opening along the length of said connecting member and opposite end groove openings at the opposite ends of said connecting member, said groove having a groove bottom spaced inwardly of said connecting member from said longitudinal groove opening, said groove having joining groove surfaces facing generally toward said groove bottom, said end portions of said conductors having said joining portions extending into said groove through said end groove openings with said longitudinal axes aligned, said main body portions of said end portions being located outside said groove adjacent said longitudinal groove opening, and independent yieldable biasing means mounted on and carried by each said joining portion on each said end portion independently of said connecting member for biasing against said groove bottom and urging said joining portion surfaces into engagement with said joining groove surfaces.

2. The joint of claim 1 wherein said biasing means comprises a metal spring member on each said end portion, said spring member having a connecting portion for connection with said joining portion, and a bowed spring extending from said connecting portion toward the free end of each said end portion.

3. The joint of claim 2 wherein said connecting portion includes a first portion receiving said joining portions in engagement with said joining surfaces and a second portion extending rearwardly from said first portion and having a downwardly extending bent portion, said joining portion having a slot therein extending generally perpendicular to said axes, and said downwardly extending bent portion being received in said slot.

4. The joint of claim 1 including a holder of dielectric material receiving said connecting member.

5. The joint of claim 1 wherein said main body portion has a flat outer surface opposite from said joining portion and opposite side edges, said end portions of said conductors having terminal ends extending diagonally of said longitudinal axes, said terminal end on each said conductor intersecting one of said side edges at an included obtuse angle to define an obtuse corner and intersecting the other of said side edges at an included acute angle to define an acute corner, and said conductors being positioned with said obtuse corner on one facing said acute corner on the other.

6. The joint of claim 5 wherein said acute corner is cut off along a line extending generally perpendicular to said axes, said line having a length substantially less than the distance from said other side edge to said axes.

7. The joint of claim 6 wherein said terminal ends on said conductors are longitudinally spaced-apart from one another a small distance.

8. The joint of claim 1 wherein said conductors have terminal ends longitudinally spaced-apart from one another a small distance.

9. An elongated electrical conductor having a longitudinal axis and an end portion including a terminal end, said conductor including a main body portion having a generally flat outer surface and an integral joining portion extending from said main body portion opposite from said flat outer surface, said joining portion having joining surfaces facing generally toward said main body portion in outwardly-spaced relationship thereto, joining means attached to said joining portion at said end portion for joining said end portion to a connector, said joining means comprising a one-piece joining member including an attaching portion receiving said joining portion and an integral bowed spring portion extending upwardly and then downwardly in a direction from said attaching portion toward said terminal end, and said attaching portion and said joining portion being fixed against longitudinal movement relative to one another.

10. The conductor of claim 9 wherein said terminal end extends diagonally of said axis and said main body portion has opposite side edges, said terminal end intersecting one of said side edges at an included obtuse angle to define an obtuse corner, said terminal end intersecting the other of said side edges at an included acute angle to define an acute corner, said acute corner being cut along a line extending generally perpendicular to said axis, and said line having a length substantially less than the distance between said other side edge and said axis.

11. The conductor of claim 9 wherein said bowed spring portion has a free end portion engaging said joining portion and said bowed spring portion is stressed, and free end portion being freely slidably movable longitudinally of said joining portion.

12. The conductor of claim 11 wherein said free end portion is flattened to facilitate sliding thereof on said joining portion when said bowed spring portion is further stressed by deforming same toward said joining portion.

13. An elongated electrical conductor having a longitudinal axis and an end portion including a terminal end, said conductor including a main body portion having a generally flat outer surface and an integral joining portion extending from said main body portion opposite from said flat outer surface, said joining portion having joining surfaces facing generally toward said main body portion in outwardly-spaced relationship thereto and having a transverse slot therein, joining means attached to said joining portion at said end portion for joining said end portion to a connector, said joining means including an attaching portion receiving said joining portion, said attaching portion including a rearwardly extending tang having a downwardly bent portion received in said slot, and said joining means including a bowed spring portion extending upwardly and then downwardly in a direction from said attaching portion toward said terminal end.

* * * * *